United States Patent [19]

Wyndham et al.

[11] 4,139,602

[45] * Feb. 13, 1979

[54] PREFERENTIAL CHLORINATION OF ALUMINA IN KAOLINITIC ORES

[75] Inventors: Ronald Wyndham, New Orleans; John C. Terry, Metairie, both of La.

[73] Assignee: Toth Aluminum Corporation, New Orleans, La.

[*] Notice: The portion of the term of this patent subsequent to Apr. 4, 1995, has been disclaimed.

[21] Appl. No.: 814,834

[22] Filed: Jul. 11, 1977

Related U.S. Application Data

[63] Continuation of Ser. No. 631,315, Nov. 12, 1975, abandoned.

[51] Int. Cl.² .............................................. C01F 7/60
[52] U.S. Cl. .................................. 423/496; 423/136; 423/137
[58] Field of Search ............... 423/135, 136, 137, 495, 423/496; 75/111, 112

[56] References Cited

U.S. PATENT DOCUMENTS

| | | | |
|---|---|---|---|
| 702,943 | 6/1902 | Guiraud | 423/334 |
| 1,268,015 | 5/1918 | King et al. | 423/136 |
| 1,392,044 | 9/1921 | Booth | 423/495 |
| 1,509,605 | 9/1924 | McKee | 423/136 |
| 2,084,289 | 6/1937 | McAfee et al. | 423/136 |
| 2,239,880 | 1/1937 | Curll | 423/334 |
| 2,823,098 | 2/1958 | Mockrin | 423/334 |
| 3,816,093 | 6/1974 | Hildreth | 75/112 |
| 4,082,833 | 4/1978 | Wyndham et al. | 423/496 |

OTHER PUBLICATIONS

Syeferovich, Y. E. "The Chlorination of Kaolin in the Presence of a Catalyst for the Production of Anhydrous Aluminum Chloride", *J. Chem. Ind.* (Moscow), 1934, No. 10, pp. 62-64 (Translation relied on.).

Krech, E. I. "Catalytic Chlorination", Journal of General Chemistry (USSR), vol. 7, pp. 1249-1263, (1937) (Translation).

*Primary Examiner*—Brian Hearn
*Attorney, Agent, or Firm*—Holman & Stern

[57] ABSTRACT

The present invention provides a novel process for the preferential chlorination of alumina over silica in the carbo-chlorination of kaolinitic ores to produce aluminum chloride. The process comprises introducing small amounts of alkali metal compounds with oxyanions into the carbo-chlorination process. Preferred embodiments are directed to particular compounds of alkali metals with oxyanions selected from the group consisting of carbonates, sulfates, hydroxides, oxides, phosphates, and the like. The present invention results in significantly reduced energy, manufacturing, and equipment costs and thus represents a breakthrough in the utilization of domestic ores such as kaolinitic clay for the production of aluminum chloride or alumina through oxidation of the aluminum chloride.

12 Claims, No Drawings

PREFERENTIAL CHLORINATION OF ALUMINA IN KAOLINITIC ORES

This is a continuation of application Ser. No. 631,315, filed November 12, 1975, and now abandoned.

BACKGROUND OF THE INVENTION

The present invention relates to the preferential chlorination of alumina over silica in kaolinitic ores to produce aluminum chloride. More specifically, the instant invention is primarily concerned with the preferential carbo-chlorination of alumina over silica in kaolinitic clay in the presence of compounds of alkali metals with oxyanions.

DESCRIPTION OF THE PRIOR ART

Processes for the chlorination of kaolinitic ores to produce aluminum chloride by carbo-chlorination are old and well known in the art. A distinct characteristic disadvantage of these prior art techniques, however, is the fact that silicon tetrachloride is normally produced at essentially the same rate and yield as aluminum chloride. This imposes a considerable economic burden upon these processes for the following reasons: carbon is consumed in the carbo-chlorination of the silica; the silicon tetrachloride is very volatile so ordinarily would be recovered by costly refrigeration of the gases; and the recovery of chlorine from the silicon tetrachloride by oxidation with oxygen is an expensive step. These prior art limitations have long been recognized and are evident by the fact that there has been no commercially practiced process for producing aluminum chloride from kaolinitic ores such as clay.

There have been efforts, however, to develop carbo-chlorination processes wherein the chlorination of silica is suppressed without reducing alumina chlorination. For example, U.S. Pat. No. 1,866,731 and British Pat. No. 305,578 describe processes for the preferential carbo-chlorination of alumina over silica in clay by recycling large amounts of silicon chloride with the chlorine which is taught as suppressing the formation of additional silicon chloride. This prior art has apparently never been used commercially, presumably because it appears to be inoperative as actual laboratory tests indicate, and even if workable, such processes would require heavy capital cost which must be borne for refrigeration and other equipment to cool the product chlorides to the very low temperatures necessary to condense out and thus separate and recycle the volatile silicon chloride from the aluminum chloride. Thus, while the prior art is replete with processes for the carbo-chlorination of kaolinitic ores, none of these processes teach how to clearly and economically chlorinate alumina over silica in kaolinitic ores, and especially, by the carbo-chlorination of such ores pursuant to the present invention involving conducting the reaction in the presence of a compound of an alkali metal with an oxyanion.

SUMMARY OF THE INVENTION

A primary objective of the present invention is to provide a carbo-chlorination process for the preferential chlorination of alumina over silica in kaolinitic ores to produce aluminum chloride.

The present invention offers as a distinct advantage and feature over the prior art the provision for the first time of a commercially attractive process for the preferential production of aluminum chloride over silicon chloride from common kaolinitic clay by a carbo-chlorination process. The aluminum chloride can be subsequently electrolyzed to aluminum metal; or readily oxidized to aluminum oxide and thereafter converted to aluminum metal pursuant to the present well known Hall commercial process.

The above objectives together with other distinguishing features and advantages of the instant invention with be apparent to one skilled in the art in light of the ensuing disclosure of its preferred embodiments.

DESCRIPTION OF THE PREFERRED EMBODIMENTS

The novel process of the instant invention involves the preferential chlorination of alumina over silica in kaolinitic ores, such as kaolin clay, in the presence of a carbonaceous reductant, such as carbon, and in the presence of a compound of an alkali metal with an oxyanion wherein the term oxyanion is defined as a simple or complex anion comprising at least one oxygen atom. The addition of the alkali metal compound in conformance with the teachings of the present discovery have the unique property when added to the kaolinitic ore of increasing the rate of formation and especially the yield of $AlCl_3$, considerably beyond what it would be without the presence of the compound. In addition, and surprisingly, the concomitant rate of formation and especially the yield of silicon chloride relative to the $AlCl_3$ produced, is at a very low level.

While not wishing to be bound by theory, it is believed that the active form of the compound of alkali metal with oxyanion is as the alkali metal oxide and/or hydroxide. The mechanism by which the compound of alkali metal with oxyanion is converted to its corresponding alkali metal oxide and/or hydroxide is thought to be through decomposition of the anion upon exposure to heat, reducing agents, the ore, and/or combinations thereof. If moisture is present in the system as for example, in calcination the alkali metal hydroxide may be formed first and then upon additional decomposition the alkali metal oxide is formed.

A preferred process sequence utilizing kaolin clay is to initially dry and comminute the clay followed by calcination of the clay in the temperature range of from 500° C. to 1000° C. When coke from coal, petroleum, lignite or similar material is utilized as the reducing agent it can be added to the clay before calcination to provide for the simultaneous calcination of both the clay and the reducing agent. In any event, the dry clay, with or without a reducing agent, is first comminuted and then calcined to remove chemically bound water. Also at this stage, pursuant to the present invention, it is preferred to add the compound of alkali metal with oxyanion to the reaction mass to be calcined to provide for its simultaneous drying since in some cases, it may be wet or contain chemically bound water. Addition of the compound of alkali metal with oxyanion to the reaction mass after calcination of the other reactants, however, also produces good results. Following calcination of the clay and the addition of the compound of alkali metal with oxyanion, the reaction mass is carbo-chlorinated in the temperature range of from 600° C. to 1000° C.

The most salient feature of the present invention is the fact that the inclusion of the compound of alkali metal with oxyanion provides for the preferential chlorination of alumina over silica in kaolinitic ores such that high yields of aluminum chloride are realized while simultaneously maintaining low yields of silicon chloride. In the case of kaolin clay, the yield of aluminum chloride generally exceeds 70% and quite often exceeds 80% while the yields of silicon chloride are generally less than 30% and frequently less than 10%. This is in sharp contrast to the results characteristically obtained by prior art processes without the additives of the present invention wherein alumina and silica are carbo-chlorinated about equally. In the latter instance, the poor economics of such chlorination is apparent even if the chlorine values could be readily recovered.

Concomitant with the low levels of silicon chloride produced by way of the present discovery is the reduced levels of reducing agent required for kaolin clay chlorination such that in the case of carbon as the reducing agent, only 15% or less carbon (based on weight of calcined clay), is required in order to achieve a high yield of aluminum chloride instead of the 30-50% commonly required otherwise in the prior art. This realization also represents another significant feature of the present invention, especially from a commercial viewpoint since the relatively high usage of carbon in typical prior art processes imposes an economic burden on those processes.

Another salient feature of the instant invention is the fact that it can be carried out at essentially atmospheric pressure which represents a preferred embodiment of the present invention. Pressures less than 100psi are satisfactory, especially from about 15psi to about 40psi. These and other elegant advantages and features of the present invention will come to light as the discussion proceeds.

Another feature of the present invention is the fact that it can be conducted at low temperatures, within the range of from 600° C. to 1000° C., and preferably at about 700° C. The use of low temperatures minimizes the initial capital cost of process equipment as well as the cost of its subsequent operation and maintenance.

The compounds of alkali metals with oxyanions as employed in the above described process of the instant invention are preferably compounds selected from the group consisting of alkali metal carbonates, sulfates, hydroxides, and oxides. Of the alkali metals, the preferred are sodium, potassium, and lithium. Of the oxyanion moieties, the most preferred are the carbonates and sulfates, especially the former since these compounds are readily available at lower cost. Exemplary of additional oxyanions that may be used in the process of the present invention are: thiosulfates, pyrosulfates, sulfites, nitrates, nitrites, oxalates, borates, bicarbonates, phosphates, and the like. Particularly preferred specific compounds are as recited in the ensuing working examples and accordingly, need not be repeated here. Moreover, it would also be obvious to one skilled in the art, that various other metal salts also are usable in the present process to achieve the same results fully comprehended within the spirit and intent of this invention.

To demonstrate the unique discovery of the present invention, the following working examples are presented wherein all parts are by weight unless otherwise specified.

EXAMPLES 1-13

A series of carbo-chlorination reactions was carried out in shallow boats placed in a horizontal tube furnace using a readily available kaolin clay containing 38% $Al_2O_3$, 44% $SiO_2$, 1.5% $Fe_2O_3$, 2.0% $TiO_2$, and 14% $H_2O$. In each example, the clay was first dried at 140° C. to remove free water and thereafter was ground to about −200 mesh. About one gram of the ground clay was then mixed with 15% by weight of powdered carbon and 5% by weight of the compound of alkali metal with oxyanion shown in Table I below and the resultant mixture then calcined in a boat at 700° C. for one hour under an argon purge of 200 cc/min. to remove chemically bound water and any residual free water. After calcination, the reaction mixtures were chlorinated in situ for 10 to 15 minutes at 700° C. under pure chlorine at a flow rate of 250 cc/min. The results of these carbo-chlorination example reactions are summarized in Table I below together with comparative example No. 13 wherein no oxyanion compound was employed.

TABLE I

| EXAMPLE NO | ADDITIVE COMPOUND | REACTION TIME(min) | % CHLORINATION $Al_2O_3$ | $SiO_2$ | PRODUCT RATIO $Al_2O_3/SiO_2$ |
|---|---|---|---|---|---|
| 1 | $Na_2CO_3 \cdot H_2O$ | 15 | 69.6 | 5.6 | 12.4 |
| 2 | NaOH | 15 | 93.8 | 32.5 | 2.9 |
| 3 | $K_2S_2O_7$ | 10 | 82.8 | 8.2 | 10.1 |
| 4 | $Na_2SO_3$ | 10 | 70.1 | 0.5 | 140.0 |
| 5 | KOH (1%) | 10 | 70.8 | 1.5 | 47.2 |
| 6 | $Na_2S_2O_3$ | 10 | 89.4 | 22.2 | 4.0 |
| 7 | $Na_2SO_4$ | 10 | 72.4 | 24.7 | 2.9 |
| 8 | $K_2CO_3$ | 10 | 86.4 | 14.3 | 6.0 |
| 9 | $Li_2CO_3$ | 10 | 89.8 | 28.2 | 3.2 |
| 10 | $NaNO_2$ | 10 | 86.7 | 7.9 | 11.0 |
| 11 | $Na_2C_2O_4$ | 10 | 52.0 | 12.0 | 4.0 |
| 12 | LiOH | 10 | 62.5 | 0.5 | 125.0 |
| 13 | NONL | 15 | 12.4 | 15.6 | 0.8 |

By comparing examples Nos. 1-12 with comparative example No. 13, it can be clearly seen that the addition of compounds of alkali metals with oxyanions to the carbo-chlorination of clay has a significant catalytic effect such that the preferential chlorination of alumina over silica occurs. Additionally, it would appear that in some cases the addition of a compound of alkali metal with oxyanion not only promotes the preferential chlorination of alumina but also suppresses the chlorination of silica to a level below what would otherwise have been obtained with no additive. Further, it can be seen that under the conditions utilized, the addition of some additives result in higher alumina chlorinations and higher product $Al_2O_3$ to $SiO_2$ ratios than other additives. In any event, these data clearly illustrate a wide range of operable compounds of alkali metals with oxyanions to achieve preferential chlorination of alumina over silica as per the process of the present invention.

EXAMPLES 14-16

A series of carbo-chlorination reactions was carried out in shallow boats placed in a horizontal tube furnace using the same clay described above. In each example, the dried, −200 mesh clay was mixed with 15% by weight of powdered carbon and with the amounts of anhydrous sodium carbonate, $Na_2CO_3$, shown in Table II. The thus prepared mixtures containing about one gram of clay each were then calcined and chlorinated as described above. The results of these carbo-chlorination example reactions are summarized in Table II below:

TABLE II

| Ex. NO. | % $Na_2CO_3$ ADDED | REACTION TIME (min) | % CHLORINATION $Al_2O_3$ | $SiO_2$ | Product Ratio $Al_2O_3/SiO_2$ |
|---|---|---|---|---|---|
| 14 | 1% | 15 | 59.0 | 10.0 | 5.9 |
| 15 | 4% | 15 | 69.6 | 5.6 | 12.4 |
| 16 | 40% | 30 | 65.0 | 0.4 | 162.5 |

Example reactions Nos. 14–16 illustrate the process of the present invention utilizing sodium carbonate as the additive compound over a wide range of additive levels. As can be seen, an increase in the level of sodium carbonate from 1% to 4% increased the percent of alumina chlorinated but the further increase from 4% to 40% had a slight negative effect on yield. The silica yield, however, decreased essentially proportionally to the increase in additive level such that the absolute amount of silica chlorinated decreased in each case and the $Al_2O_3/SiO_2$ product ratio increased in each case. These examples thus serve to illustrate the wide range of additive levels over which the process of the present invention can be practiced.

EXAMPLES 17 and 18

A series of carbo-chlorination reactions was carried out in shallow boats using the same ore and the same apparatus described above. In each example, the dried, −200 mesh clay was mixed with 4% by weight of anhydrous sodium carbonate and with 15% by weight of powdered vegetable carbon in example No. 17 and 15% by weight of powdered petroleum coke in example No. 18. In both examples the reaction mass was calcined for 45 minutes under a purge of 200 cc/min nitrogen and was subsequently chlorinated in situ for 15 minutes under pure chlorine at a flow rate of 250 cc/min. The results of these carbo-chlorination example reactions are summarized in Table III below.

TABLE III

| EXAMPLE NO. | REDUCTANT | % CHLORINATION $Al_2O_3$ | $SiO_2$ | PRODUCT RATIO $Al_2O_3/SiO_2$ |
|---|---|---|---|---|
| 17 | Carbon | 69.6 | 5.6 | 12.4 |
| 18 | Pet. Coke | 59.0 | 6.0 | 9.8 |

Example reactions Nos. 17, 18 illustrate the process of the present invention utilizing two different carbon sources as the reductant, namely vegetable carbon and petroleum coke. As can be seen the reaction utilizing vegetable carbon resulted in a somewhat higher percent of alumina chlorinated than did the reaction utilizing petroleum coke. There were no significant differences in the level of silica chlorinated, however. Similar results are obtained upon utilization of carbon from other vegetable and fossil sources such as coke from coal and lignite.

EXAMPLES 19–21

A series of carbo-chlorination reactions was carried out in shallow boats using the same clay and apparatus described above. In each example, the dried, −200 mesh clay was mixed with 15% by weight of powdered carbon and 4% by weight of sodium carbonate and the reaction mass was calcined under a 200 cc/min nitrogen purge for 45 minutes and was subsequently chlorinated in situ for 15 minutes using pure chlorine at 250 cc/min flow. The specific calcination and chlorination temperatures for examples Nos. 19–21 are given in Table IV below:

TABLE IV

| Ex. NO. | CALCINATION TEMP. | % CHLORINATION TEMP. | $Al_2O_3$ | $SiO_2$ | PRODUCT RATIO $Al_2O_3/SiO_2$ |
|---|---|---|---|---|---|
| 19 | 850° C | 700° C | 63.4 | 1.0 | 63.4 |
| 20 | 850° C | 850° C | 38.9 | 8.9 | 4.4 |
| 21 | 700° C | 850° C | 43.4 | 7.9 | 5.5 |

Example reactions Nos. 19–21 illustrate the process of the present invention utilizing several combinations of calcination and chlorination temperatures. In comparing example No. 19 to examples 20 and 21, it can be seen that the higher chlorination temperature of 850° C. combined with either the 700° C. or 850° C. calcination temperature resulted in significantly lower alumina yields temperature and higher silica yields than did the chlorination at 700° C. combined with the 850° C. calcination. Further, the combination of a 700° C. calcination and a 700° C. chlorination temperature as given in example reaction No. 15 above, resulted in somewhat higher alumina and silica chlorinations than example reaction No. 19. Thus there is a significant effect of temperature in the process of the present invention and the optimum temperatures for calcination and chlorination should be determined experimentally for the particular ore and equipment utilized. In any event, the addition of the compound of alkali metal with oxyanion did result in preferential chlorination of alumina over silica in the above example reactions even though in some cases the yield of alumina was reduced, depending on the specific combination of calcination and chlorination temperatures utilized.

EXAMPLES 22 and 23

A series of carbo-chlorination reactions was carried out in a 10mm diameter, batch, fluid bed, quartz reactor having external heating means. The clay utilized had the same composition and was dried and comminuted as described above. The clay was mixed with 15% powdered carbon in example No. 22 and was mixed with 100% powdered carbon in example No. 23. Both reaction masses were further mixed with 4% by weight sodium carbonate and were calcined in the fluid bed reactor at 700° C. for 45 minutes under a 200 cc/min nitrogen purge. After calcination, the reaction masses were chlorinated in situ with pure chlorine at a flow rate of 250 cc/min for 20 minutes. The results of example reactions Nos. 22 and 23 are summarized in Table V below:

TABLE V

| EXAMPLE NO. | % CARBON ADDED | % CHLORINATION $Al_2O_3$ | $SiO_2$ | PRODUCT RATIO $Al_2O_3/SiO_2$ |
|---|---|---|---|---|
| 22 | 15 | 63.2 | 18.8 | 3.4 |
| 23 | 100 | 63.5 | 22.5 | 2.8 |

Example reactions Nos. 22 and 23 illustrate the process of the present invention utilizing a wide range of carbon levels as the reductant. Specifically, example No. 22 contained 15% powdered carbon whereas example No. 23 contained 100% powdered carbon, i.e., an amount of carbon equal in weight to the clay. As can be seen, the use of a large excess of carbon had essentially no effect on alumina chlorination and had only a small effect on silica chlorination.

EXAMPLES 24–29

A series of fluid bed carbo-chlorination reactions was carried out with the same clay and with the same apparatus described above. The calcination and chlorination conditions were varied in each of the example reactions with the specific condition for each test given in Table VI along with a summary of results.

Examples Nos. 25 through 28 illustrate the general operability of the process of the present invention in a fluid bed reactor utilizing sodium carbonate as the additive compound and various combinations of processing variables. Comparing example reactions Nos. 24 and 29 without sodium carbonate additive to example reactions Nos. 25 and 28, respectively, with the additive clearly illustrates the preferential chlorination of alumina over silica upon the addition of the additive and over the temperature extremes of 700° to 950° C. Further, comparing examples Nos. 25 and 26 shows an improved alumina chlorination upon increasing calcination time at 950° C. along with a concomitant increase in silica chlorinated. Comparing examples Nos. 26 and 27 shows that in conjunction with a 950° C. calcination temperature the use of a higher chlorination temperature leads to higher alumina and silica chlorinations. Examples Nos. 27 and 28 illustrate the use of 950° C. and 700° C. calcination temperatures with a 700° C. chlorination temperature and indicate the yield of alumina and silica in carbo-chlorination is more a function of chlorination temperature than calcination temperature per se.

TABLE VII

| EX NO. | % ADDITIVE | % CHLORINATION $Al_2O_3$ | $SiO_2$ | PRODUCT RATIO $Al_2O_3/SiO_2$ |
|---|---|---|---|---|
| 30 | 5% $Na_2CO_3$ | 72.1 | 14.2 | 5.1 |
| 31 | 5% $Na_2SO_4$ | 72.9 | 9.1 | 8.1 |

The results of example reactions No. 30 and 31 clearly illustrate the preferential chlorination of alumina over silica in clay upon the introduction of the sodium carbonate and sodium sulfate to the clay after calcination but before chlorination.

EXAMPLE 32

A fluid bed carbo-chlorination reaction utilizing the same apparatus and clay as described above was carried out wherein about 1% sodium phosphate as an aqueous solution was added to the dried −200 mesh clay along with about 17% of petroleum coke as the solid reducing agent. The reaction mass was further bound together using a starch solution and was then again dried at 140° C. for two hours to remove excess water. The dried material was ground to break up agglomerates and was calcined at 700° C. for 45 minutes under argon to remove chemically bound moisture. After calcination, the reaction mass was chlorinated for 25 minutes under chlorine at a flow rate of 400 cc/min and carbon monoxide at a flow rate of 200 cc/min. An analysis of the fluid bed residue remaining after chlorination revealed that 77.0% of the $Al_2O_3$ and 5.0% of the $SiO_2$ content of the clay had been chlorinated.

As pointed out in the above examples, the process of the present invention is operable over a wide range of: reactant concentrations; calcination and chlorination

TABLE VI

| EX. NO. | CALCINATION | | | | | CHLORINATION | | | | % CHLORINATION | | PRODUCT RATIO |
|---|---|---|---|---|---|---|---|---|---|---|---|---|
| | TEMP. °C | TIME MIN. | CARBON % | PURGE cc/min | $Na_2CO_3$ % | TEMP. °C | TIME MIN | CO cc/min | $Cl_2$ cc/min | $Al_2O_3$ | $SiO_2$ | $Al_2O_3/SiO_2$ |
| 24 | 950 | 5 | 25 | 800/CO | 0 | 950 | 20 | 250 | 250 | 28.2 | 24.9 | 1.1 |
| 25 | 950 | 5 | 25 | 800/CO | 3 | 950 | 20 | 250 | 250 | 57.0 | 11.0 | 5.2 |
| 26 | 950 | 20 | 25 | 800/CO | 3 | 950 | 20 | 250 | 250 | 71.0 | 28.0 | 2.5 |
| 27 | 950 | 20 | 25 | 800/CO | 4 | 700 | 20 | 250 | 250 | 62.5 | 18.3 | 3.4 |
| 28 | 700 | 45 | 15 | 200/$N_2$ | 4 | 700 | 20 | 0 | 250 | 63.2 | 18.8 | 3.4 |
| 29 | 700 | 45 | 15 | 200/$N_2$ | 0 | 700 | 20 | 0 | 250 | 26.5 | 16.0 | 1.7 |

EXAMPLES 30 and 31

A series of carbo-chlorination reactions was carried out in the 40mm diameter fluid bed reactor and with the same clay as described above. The dried −200 mesh clay was mixed with 15% by weight powdered carbon and was calcined at 700° C. for 45 minutes under a 200 cc/min argon purge. After calcination, 5% by weight of sodium carbonate was mixed with the reaction mass of example No. 30 and 5% by weight of sodium sulfate was mixed with the reaction mass of example No. 31. The reaction mixture of example No. 30 was then heated to 750° C. and was chlorinated for about 50 minutes at a chlorine flow rate of 200 cc/min. The reaction mixture of example No. 31 was heated to 750° C. and was chlorinated for about 20 minutes at a chlorine flow rate of 400 cc/min. The results of example reactions Nos. 30 and 31 are summarized in Table VII below:

temperatures and combinations thereof; types of reaction apparatus; types of compounds of alkali metals with oxyanions; and so on. Further, it is apparent that there are a large number of variable combinations under which the process of the present invention can be practiced and that some combinations of selected processing variables will lead to higher reaction rates, yields, and degrees of preferential alumina chlorination than others. In any event, practicing the process of the present invention according to the teachings set forth herein above results in the preferential chlorination of alumina over silica in kaolinitic ores.

The present process being primarily a dry process, the ore reactants may be prepared by either of two procedures. The ore may be first individually ground in a hammer mill, ball mill or other grinding device so as to achieve the desired particle size and then mixed with other solid reactants preparatory to its reaction. Conversely, the solid reactants may be first pre-mixed and then passed through a hammer mill, ball mill or other device to achieve the desired average particle size. The average particle size of the ore reactant should preferably be less than about 4 mm (7 mesh) and especially small enough to pass through 200 mesh. It is sometimes preferred to bind the reactants by addition of a suitable binder, e.g., starch, ligneous products, asphalt, or the like, preparatory to calcination. Generally, the binder is added in an amount of no more than 5% by weight of the ore; and the ore, the compound of alkali metal with oxyanion (where added initially), the binder and the carbon can be agglomerated as in rolling drums or tables, or by briquetting, to give consolidated particles of all reactants; and the particles so formed, then crushed to appropriate size for the calciner or chlorinator. The consolidation is important for ores that would gain from solid intimate contact of reactants. In some cases, the consolidation could advantageously be made after calcination but before chlorination.

Powdered carbon as derived from, e.g., fossil sources, vegetable sources or the like and which are readily commercially available, is preferably employed as the carbon reactant in the above carbo-chlorination reaction. Also, carbon formed on the surfaces of the ore by pyrolysis of hydrocarbon vapors is suitable.

The halogen reactant can be any chlorine containing compound capable of reaction in a carbo-chlorination reaction with ore oxides. Dry chlorine is preferred since it is inexpensive and readily commercially available.

The present processes offer as a distinguishing feature the utilization of relatively short reaction times when viewed in perspective of the prior art of chlorination reactions involving similar ores, however, in the absence of a compound of an alkali metal with an oxyanion. The benefit of such short reaction times, coupled with the important reduction in amount of silicon chloride produced hereby, renders the present new and novel process especially attractive commercially for the production of aluminum chloride and subsequently alumina and aluminum from ordinary kaolin clay.

As to the proportion of the reactants, in a carbo-chlorination reaction the carbon and chlorine are preferably present at or near stoichiometric quantities, especially to insure complete utilization of the chlorine. The amount of carbon used as brought out above will preferably be less than about 15% by weight of the ore in excess of stoichiometric proportions.

By definition, an ore is a mineral from which the metal can be extracted profitably which points out a very salient feature and advantage of the present invention. Namely, by virtue of the present process metal values can now be recovered economically from many heretofore commercially unattractive ores, especially kaolinitic ores in the production of aluminum chloride and alumina by the carbo-chlorination process of the present invention. Heretofore to the present discovery, the aluminum industry has essentially been restricted to the commercial production of alumina and aluminum utilizing as a principal ore bauxite which comprises hydrated aluminum oxide, together with associated impurities, such as the oxides of for the current Bayer process must be high grade with about 50% to 65% alumina, which is extracted to make alumina and the latter electrolyzed to aluminum metal by the Hall process. However, the Bayer alumina process has the following disadvantages: requiring costly high grade bauxites, 90% of which must be imported for the domestic Bayer plants; high costs mainly because of the very slow precipitation of the alumina (2-3 days) in huge tank farms; and it produces large volumes of waste "red mud" slime residue that covers large areas around Bayer plants; and for these reasons the manufacturing cost of Bayer alumina has become quite costly.

By virtue of the present discovery, alumina now can be made far more economically than by the Bayer process and now from previously unusable cheap and abundant domestic ores, such as kaolin clay and low grade bauxites containing kaolin clay. Another advantage of this present process utilizing kaolinitic ores is that it recovers the valuable titanium oxide along with the alumina, thus making two major industries independent of imported ores.

Another advantage of this process is that it can be conducted under conditions for which inert construction materials are available that will last and not contaminate the products. Also this process advantageously can use a wide range of batch, semi-continuous or continuous processing apparatus such as rotary kilns and reactors; fluid, static or moving bed reactors; or horizontal conveyors, to best accommodate different ores.

We claim:

1. In a a process of carbo-chlorinating a kaolinitic ore to produce aluminum chloride comprising the steps of: drying and comminuting a kaolinitic ore to form a powdered ore; mixing and calcining the powered ore and a solid carbonaceous reductant to form a reaction mass; and carbo-chlorinating the ore to produce aluminum chloride by exposing the calcined reaction mass to a chlorinating agent; the improvement comprising: admixing at least one compound of an alkali metal with an oxyanion selected from the group consisting of carbonate, sulfate, sulfite, pyrosulfate, thiosulfate, hydroxide, oxide, oxalate, phosphate, nitrite, bicarbonate and nitrate with the reaction mass before carbo-chlorination, the amount of the compound of alkali metal with oxyanion being sufficient to provide preferential carbo-chlorination of alumina over silica in the kaolinitic ore.

2. The process of claim 1 wherein the at least one compound of alkali metal with oxyanion is admixed with the ore before calcination.

3. The process of claim 1 wherein the at least one compound of alkali metal with oxyanion is admixed with the reaction mass after calcination but before carbo-chlorination.

4. The process of claim 1 wherein the alkali metal is selected from the group consisting of lithium, sodium and potassium .

5. The process of claim 4 wherein the at least one compound of alkali metal with oxyanion consists of sodium carbonate.

6. The process of claim 4 wherein the at least one compound of alkali metal with oxyanion consists of sodium sulfate.

7. The process of claim 1 wherein the solid carbon reductant is selected from the group consisting of vegetable and fossil fuels.

8. The process of claim 1 wherein the kaolinitic ore is selected from the group consisting of kaolinitic clay and bauxite containing kaolinitic clay.

9. The process of claim 1 wherein the ore is carbo-chlorinated at a temperature within the range of from about 600° C. to about 1000° C.

10. The process of claim 1 wherein the ore is carbo-chlorinated at a pressure no greater than 75 psia.

11. The process of claim 1 wherein the chlorinating agent comprises dry chlorine.

12. The process of claim 1 wherein the ore is calcined at a temperature within the range of from about 500° C. to about 1000° C.

* * * * *